US010254055B2

United States Patent
Bangert et al.

(10) Patent No.: US 10,254,055 B2
(45) Date of Patent: Apr. 9, 2019

(54) INTERCOOLER ASSEMBLY

(71) Applicant: Mahle International GmbH, Stuttgart (DE)

(72) Inventors: Boris Bangert, Heimsheim (DE); Andreas Eilemann, Erdmannhausen (DE); Karsten Emrich, Stuttgart (DE); Tobias Isermeyer, Loewenstein (DE); Hubert Pomin, Sindelfingen (DE); Timm Roeschmann, Nufringen (DE); Juergen Stehlig, Neckartenzlingen (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 15/538,651

(22) PCT Filed: Dec. 14, 2015

(86) PCT No.: PCT/EP2015/079648
§ 371 (c)(1),
(2) Date: Jun. 21, 2017

(87) PCT Pub. No.: WO2016/102230
PCT Pub. Date: Jun. 30, 2016

(65) Prior Publication Data
US 2018/0087847 A1 Mar. 29, 2018

(30) Foreign Application Priority Data
Dec. 22, 2014 (DE) .................. 10 2014 226 865

(51) Int. Cl.
*F28F 9/00* (2006.01)
*F28F 9/02* (2006.01)
(Continued)

(52) U.S. Cl.
CPC ........ *F28F 9/0239* (2013.01); *F02B 29/0462* (2013.01); *F28F 9/0075* (2013.01);
(Continued)

(58) Field of Classification Search
CPC ...... F28F 9/0239; F28F 9/0075; F28F 9/0241; F28F 9/0226; F28F 9/0231; F28F 9/0246;
(Continued)

(56) References Cited

U.S. PATENT DOCUMENTS 2,488,807 A * 11/1949 Currie .................. F28F 9/0241
165/159
3,973,621 A * 8/1976 Bow ..................... F28D 7/1653
165/83
(Continued)

FOREIGN PATENT DOCUMENTS

DE 102005017973 A1 11/2006
DE 102008018549 A1 10/2009
(Continued)

OTHER PUBLICATIONS

English abstract for DE-102005017973.
English abastract for DE-102008018549.

*Primary Examiner* — Travis C Ruby
(74) *Attorney, Agent, or Firm* — Fishman Stewart PLLC

(57) ABSTRACT

An intercooler assembly may include a housing and a cooler arranged therein through which charge air may be flowable. The housing may include an insertion opening through which the cooler may be insertable into the housing in an insertion direction transverse to the flow direction of the charge air. The cooler may include a pipe structure through which a coolant may be flowable, first and second end parts opposite each other transverse to the insertion direction, and third and fourth end parts opposite each other transverse to the first and second end parts and parallel to the flow direction, the end parts laterally delimiting and mechanically connected to the pipe structure. The cooler may be mechanically connected to the housing by the first end part, and at least one of the other end parts may be movably attached to the housing. The cooler may be pre-stressed against the housing by the third and/or fourth end part in a direction opposite a deformation of the cooler resulting from cooling of the charge air.

19 Claims, 6 Drawing Sheets

(51) Int. Cl.
*F02B 29/04* (2006.01)
*F28F 9/007* (2006.01)
*F28D 21/00* (2006.01)

(52) U.S. Cl.
CPC .......... *F28F 9/0236* (2013.01); *F28F 9/0241* (2013.01); *F28D 2021/0082* (2013.01); *F28F 2230/00* (2013.01); *F28F 2265/26* (2013.01); *Y02T 10/146* (2013.01)

(58) Field of Classification Search
CPC ........ F28F 9/06; F28F 9/10; F28F 9/12; F28F 9/14; F28F 9/08; F28F 9/16; F28F 9/165; F28F 2230/00; F28F 2265/26; F28F 2275/14; F28F 2275/08; F28F 2275/122; F28F 2275/20; F28F 2275/205; F28D 2021/0082; F02B 29/0462
See application file for complete search history.

(56) References Cited

U.S. PATENT DOCUMENTS

| | | | | |
|---|---|---|---|---|
| 4,119,141 A | * | 10/1978 | Thut | F28D 7/16 165/158 |
| 4,262,741 A | * | 4/1981 | Rothenbucher | F28F 9/013 165/162 |
| 4,401,157 A | * | 8/1983 | Cadars | F28D 1/053 165/173 |
| 4,881,595 A | * | 11/1989 | Damsohn | F28F 9/0226 165/173 |
| 7,082,988 B2 | * | 8/2006 | Yoshida | F28F 9/0075 165/166 |
| 9,175,596 B2 | | 11/2015 | Eilemann et al. | |
| 2003/0159815 A1 | * | 8/2003 | Wilson | F28D 7/08 165/157 |
| 2007/0170660 A1 | * | 7/2007 | Burgess | F28F 9/0219 277/596 |
| 2007/0175617 A1 | * | 8/2007 | Brost | F02B 29/0462 165/149 |
| 2008/0289804 A1 | * | 11/2008 | Baumann | F28D 7/1692 165/157 |
| 2013/0284412 A1 | * | 10/2013 | Forstenius | F16B 43/00 165/166 |
| 2014/0130764 A1 | | 5/2014 | Saumweber et al. | |
| 2014/0246186 A1 | | 9/2014 | Bruggesser et al. | |
| 2015/0059336 A1 | * | 3/2015 | Fehrenbach | F02B 29/0462 60/599 |
| 2015/0168076 A1 | | 6/2015 | Ferlay | |

FOREIGN PATENT DOCUMENTS

| | | |
|---|---|---|
| DE | 102010063602 A1 | 6/2012 |
| DE | 102011100629 A1 | 11/2012 |
| DE | 102011080474 A1 | 2/2013 |
| DE | 102012206121 A1 | 10/2013 |
| EP | 2886823 A1 | 6/2015 |
| WO | WO-2006/088411 A1 | 8/2006 |
| WO | WO-2007031274 A1 | 3/2007 |

* cited by examiner

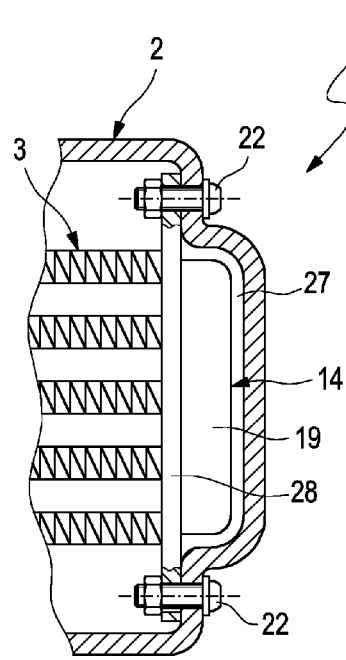
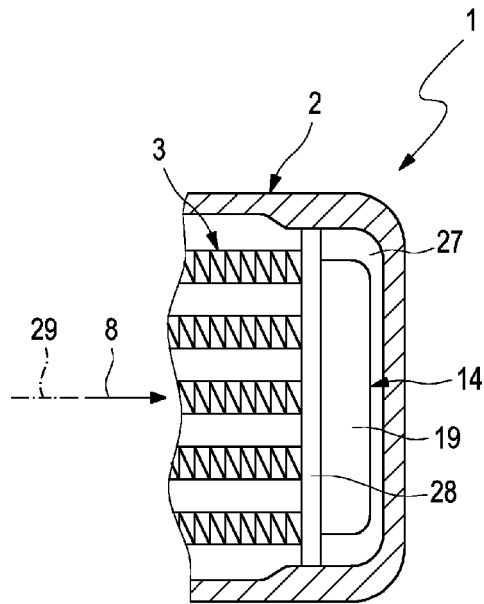
Fig. 8    Fig. 9
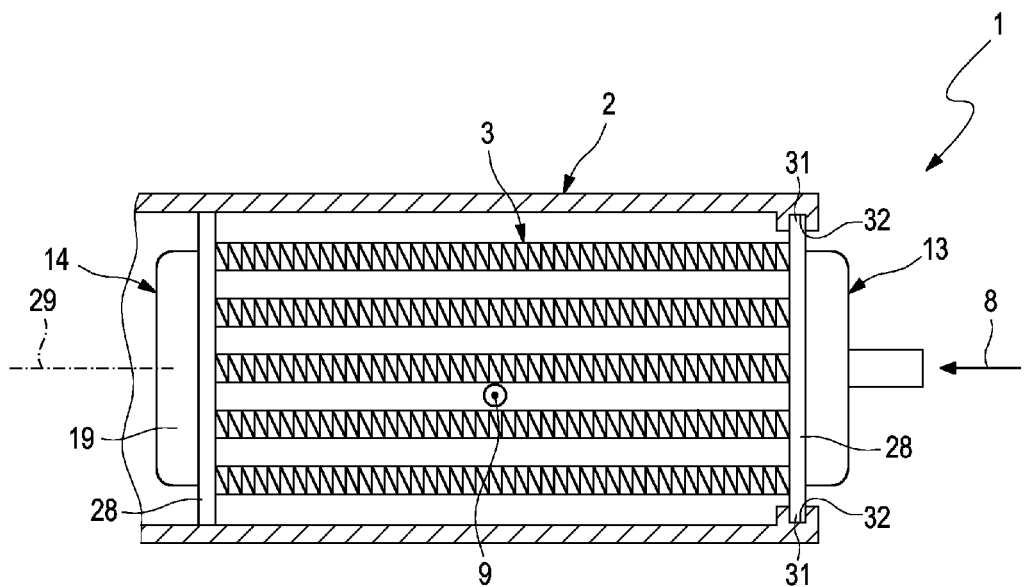
Fig. 10

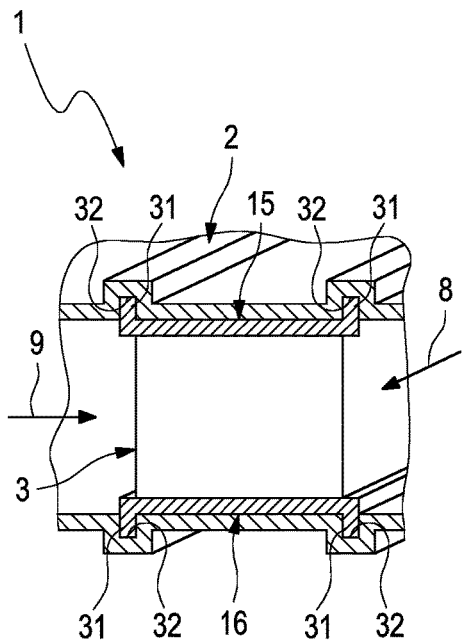
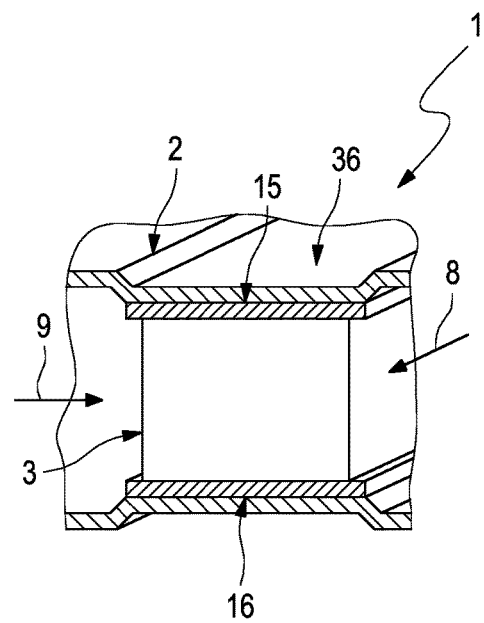
Fig. 11        Fig. 12
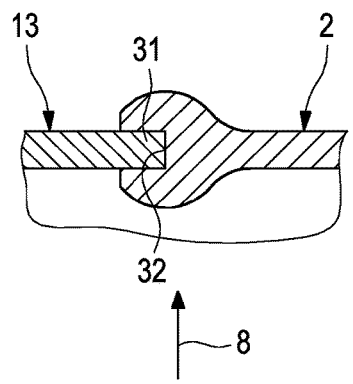
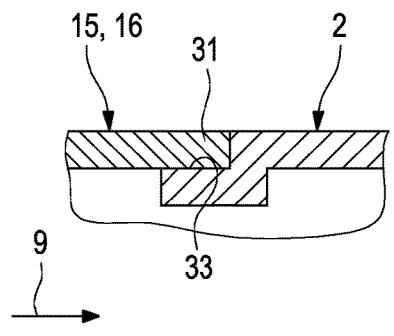
Fig. 13        Fig. 14

INTERCOOLER ASSEMBLY

CROSS-REFERENCE TO RELATED APPLICATIONS

This application claims priority to International Patent Application Number PCT/EP2015/079648, filed on Dec. 14, 2015, and German Patent Application Number DE 10 2014 226 865.6, filed on Dec. 22, 2014, the contents of both of which are incorporated herein by reference in their entireties.

TECHNICAL FIELD

The present invention relates to an intercooler assembly comprising a housing through which flow can pass and a cooler of charge air, arranged therein.

BACKGROUND

For the operating of internal combustion engines, the supply of air in combustion chambers of the internal combustion engine is necessary. The air is frequently compressed by introducing into the combustion chambers and is present as charge air. Hereby, an increased density of the air and therefore an increased efficiency of the combustion processes is able to be realized in the internal combustion engine. By the compressing of the air, which can take place by means of a turbocharger, in accordance with known thermodynamic principles an increase of the air is involved, which is in opposition to the efficiency of the internal combustion engine in a counter-productive manner. For the at least partial neutralization of this disadvantageous effect, a cooling of the charge air can be carried out following the compressing of the air. Such a cooling can take place for example by means of a cooler or respectively intercooler, which is arranged in a housing of an intercooler assembly and is connected to the cooler. The cooler can be flowed through by a coolant for cooling the charge air, wherein the flows of the coolant and of the charge air are fluidically separated from one another. Therefore, the contact of the cooler, which is cooler compared to the charge air, leads to a cooling of the charge air and accordingly to a heating of the cooler.

Such an intercooler assembly is known from DE 10 2012 206 121 A1. This arrangement has a housing through which flow can pass, in which a cooler with a pipe structure is arranged. The pipe structure is surrounded by end parts. Between the pipe structure and one of the end parts, a sealing means is provided for sealing the cooler.

WO 2006/088411 A1 discloses an intercooler assembly comprising a housing and a cooler arranged therein. In addition, four end parts are provided, wherein three of the end parts are mechanically connected to the housing and the other end part is spaced apart from the housing.

The flow of the charge air or respectively the air flow along the cooler leads here to a temperature difference within the cooler, in particular in the direction of flow of the charge air. This temperature difference within the cooler can lead to a deformation of the cooler, which is connected to the housing, which deformation can lead to damage to the cooler and/or to the housing. The deformation can cause, in particular, leaks at the housing or respectively at the cooler, which would result in an escaping of charge air or respectively of coolant.

SUMMARY

The present invention is concerned with the problem of indicating for an intercooler assembly of the type named in the introduction an improved or at least a different embodiment, which is distinguished in particular by a higher loading capacity and/or an increased service life.

This problem is solved according to the invention by the subject of the independent claims. Advantageous embodiments are the subject of the dependent claims.

The present invention is based on the general idea of mechanically connecting a cooler of an intercooler assembly by means of an end part of the cooler to a housing of the assembly through which flow can pass, and to configure this connection so as to be flexible. In particular, the end part is attached to the housing movably with respect to the housing. Hereby, the cooler, at least in the region of the end part, is also movable with respect to the housing. Therefore, for example, thermodynamic expansions or respectively contractions of the cooler and/or of the housing can be compensated. In particular, hereby, deformations of the cooler which occur as a result of temperature differences within the cooler can be compensated. This has the result that the service life of the assembly, in particular of the cooler, is extended, because a damage to the assembly caused by the thermodynamic expansions and contractions is prevented or at least reduced. In addition, the assembly can hereby be exposed to higher stresses, so that an increased efficiency of the assembly, in particular of the cooling performance of the cooler, is able to be realized. Thermodynamic expansions and/or contractions and the deformations connected therewith take place in particular as a result of temperature fluctuations or respectively temperature differences within the cooler and/or the housing. The cooler serves for the cooling of air, for example to be supplied to an internal combustion engine, wherein the air can be previously compressed or respectively charged and therefore can be present as charge air. In the following, the term "charge air" is used consistently, wherein it is clear that the assembly can also come into use for the cooling of non-compressed air. For cooling the charge air, a coolant, in particular water, flows through the pipe structure of the cooler. The cooler is furthermore able to be flowed through by charge air, wherein the flows of the coolant within the pipe structure and of the charge air through the cooler are fluidically separated. Consequently, the charge air, on flowing through the cooler, is cooled indirectly or directly by the pipe structure. For this, the coolant advantageously has a lower temperature than the charge air. The pipe structure is delimited laterally by two such end parts, namely a first end part and a second end part. The end parts are advantageously connected mechanically to the pipe structure and oppositely arranged. Provision can be made that the pipe structure is hereby held together by the end parts.

This means in particular that the end parts prevent the pipe structure from falling apart. According to the invention, provision is made that the cooler is connected to the housing by means of at least one such end part, preferably by means of both end parts. Here, at least one of the end parts is attached to the housing in a movable manner with respect thereto. The mobility of the attachment part relative to the housing is therefore provided in at least one movement direction in a range of mobility which is delimited in particular by the abutting of the cooler on the housing. Within the respective range of movement in the associated movement direction, the cooler can therefore move relative to the housing, whereby the space according to the invention for the contractions or respectively expansions caused by the temperature differences is created or is counteracted.

The charge air which is to be cooled flows along the pipe structure. In so doing, the charge air cools down. Thereby, temperature differences occur in the pipe structure, which can lead to a corresponding deformation of the pipe structure and of the cooler. This deformation can be present for example in the form of a bending of the pipe structure. Here, expansions in warmer regions of the cooler, in particular of the pipe structure, and/or contractions in cooler regions of the cooler, in particular of the pipe structure, lead to a bending of the cooler or respectively of the pipe structure. The warmer regions of the cooler here are frequently those of the cooler which face the flow of the charge air, whereas the colder regions are those which face away from the air flow. These deformations are compensated by means of the solution according to the invention. In the following, the term "deformation" is used for any type of expansions and contractions and the combinations thereof, and in particular bending.

The pipe structure can have one or more flow paths for the coolant, which can be formed by one or more pipes. The pipes run advantageously between the end parts and are mechanically connected to the latter. For improved cooling, it is advantageous to configure said pipes so as to be thin. In particular, flat pipes can come into use for this. The solution according to the invention makes it possible here to use flatter or respectively thinner pipes, in order to increase the efficiency of the assembly through an improved temperature compensation between charge air and pipe structure.

The assembly can basically have a plurality of fluidic outlets, in order for example to supply a plurality of combustion chambers of the associated internal combustion engine with charge air. For this, usually a distributor comes into use. Here, the housing can be configured as a distributor housing or can have such a distributor. In these cases, the cooler is preferably arranged within the distributor or in any desired section within the housing upstream of the distributor. Of course, the cooler could also be arranged downstream of the distributor.

For arranging the cooler into the housing, the housing advantageously has an insertion opening, into which the cooler is inserted or respectively from which the cooler is withdrawn on mounting and/or for exchanging the cooler in an insertion direction. The insertion opening is preferably oriented transversely to the flow direction of the charge air, so that the insertion direction also runs advantageously transversely to the flow direction of the charge air. The end parts are preferably arranged in the insertion direction oppositely or transversely to the insertion direction, in particular oppositely, perpendicularly to the insertion direction.

The respective end part can be configured in any desired manner. In particular, it is conceivable to construct the respective end part in one piece or respectively in a monolithic manner. However, it is also conceivable that at least one of the end parts is configured in several pieces.

According to the invention, the cooler, in particular the pipe structure, is pre-stressed against the housing by means of at least one such end part. The pre-stressing is oriented in the opposite direction to the deformation of the cooler, in particular of the pipe structure, which is to be expected in the cooling of the charge air. This means that the cooler, in particular the pipe structure, is negatively pre-stressed. Consequently, the deformation or respectively bending of the cooler or respectively of the pipe structure which has taken place through the cooling leads to a compensation of the pre-stressing and therefore to a return of the cooler to its original shape. In particular, it is advantageous to pre-stress the cooler, in particular the pipe structure, through the pre-stressing in an opposite direction to the deformation or respectively the bending, and/or to subject it to an elastic deformation complementary to the deformation or respectively to the bending. Here, the end part pre-stressing the cooler, in particular the pipe structure, can be attached immovably or respectively securely to the housing, in order to realize the pre-stressing in a stable manner.

Advantageously, at least one such end part is arranged spaced apart from the housing or respectively from a wall of the housing. Here, this end part can be attached to the housing. The spaced-apart arrangement of the end part to the housing leads to a freedom of movement of the end part with respect to the housing, or at least a simplification to that effect. Therefore, a better compensation of the deformations of the cooler or respectively of the pipe structure can take place.

The end parts preferably stabilize the cooler mechanically. For this, it is advantageous if at least one of the end parts has a wall which preferably runs in a planar manner. The wall leads to a reinforcing of the cooler and therefore to a corresponding mechanical stability and runs in the direction of the air flow, in particular parallel thereto.

The movable attachment of the end part to the housing can be achieved with the use of an elastic element. The elastic element is preferably arranged between the end part and the housing and is configured or respectively constructed such that it permits relative movements between the end part and the housing. The elastic element is preferably produced from a plastic which is suitable for the conditions and temperatures prevailing in the housing.

The arranging of the elastic element between the housing and the end part can be realized in any desired manner, in so far as hereby the relative movement between the housing and the end part is possible in the desired range. For this, it is conceivable to provide the housing with a groove on the inner side, into which the elastic element is arranged at least in certain areas.

Here, the elastic element can have any desired shapes and/or sizes and run in any desired manner. In preferred variants, the elastic element extends in a circumferential direction of the cooler along the associated end part. This leads to as uniform a mobility as possible of the end part relative to the housing.

In the case of end parts lying opposite in insertion direction, it is advantageous if the first end part has an end flange which cooperates with an associated housing flange of the housing, in order to connect the end part and the housing to one another. It is preferred here if the end part arranged in the region of the insertion opening has the end flange, in order to simplify a mounting of the cooler in the housing. Accordingly, the housing preferably has at the insertion opening the housing flange which can have or surround the insertion opening.

Embodiments are preferred, in which at least one of the end parts has a protruding edge, by means of which the end part is connected to the housing. The respective edge protrudes here in the direction of extent of the end part or transversely, in particularly perpendicularly, thereto, from the end part. This leads to an increased stability of the cooler, and/or to an improved mobility of the end part with respect to the housing.

The edge is advantageously arranged in an associated slot of the housing on the inner side and is connected to the housing. Alternatively, the edge can be arranged on a placement area of the housing on the inner side and can be connected there to the housing. Thereby, in particular, a form-fitting connection of the edge to the housing can come about, which permits a movement of the edge along the associated slot or transversely thereto, and therefore a relative movement of the cooler relative to the housing.

It is also conceivable to connect the edge to the housing additionally or alternatively in any other desired manner. For this, the edge can be soldered and/or welded and/or bonded and suchlike to the housing.

It is also conceivable to solder and/or weld and/or bond at least one end part to the housing such that a relative movement of the end part to the housing is guaranteed.

In addition to the first end part and the second end part, the cooler can have a third end part and a fourth end part lying opposite the third end part. The third and the fourth end part serve in particular to increase the stability of the cooler. The third and the fourth end part run transversely here, in particular perpendicularly, to the first and second end part and delimit the tube structure at the associated sides. Therefore, the cooler, assuming a cuboid-like basic shape, is able to be flowed through on two opposite sides and is delimited at the other side by the end parts. In this case, the cooler is purposefully arranged in the housing such that the end parts run in the direction of the air flow, in particular parallel thereto, so that as resistance-free a flow as possible of the charge air through the cooler is achieved. Thus, in particular two of the end parts therefore lie opposite with respect to the insertion direction, and the other two opposite transversely to the insertion direction.

In preferred configurations, two of the end parts, lying opposite one another, are connected to one another by means of a tension anchor. The connection by means of the tension anchor leads to the end parts, which are connected hereby, being movable transversely to the tension anchor and relative to one another, in particular in their respective plane of extent. Thereby, likewise, a compensation can take place of the deformations which have taken place through the cooling. This effect can be intensified in that the connection of the cooler to the housing is realized by means of at least one of the other end parts. A further improvement takes place in that the adjacent end parts are arranged in a contactless manner to one another. The tension anchor can be configured here in any desired manner and can have for example a cylinder and/or a screw and/or a bar. Here, the respective tension anchor preferably does not run through the pipe structure. Variants are preferred in addition, in which end parts running transversely to the insertion direction and lying opposite one another are connected to one another with such a tension anchor.

The supplying of the pipe structure with coolant takes place preferably by means of a circuit, by the coolant being introduced through at least one inlet into the pipe structure and arriving out from the pipe structure through at least one outlet.

According to an advantageous embodiment, one of the end parts has a coolant box or is constructed as such. This preferably concerns the end part remote from the insertion opening in the insertion direction, in order to simplify a mounting of the cooler into the housing. The coolant box serves in particular for redirecting the coolant within the pipe structure. For this, the coolant box can have at least one diversion chamber, which diverts the coolant arriving from first pipes to second pipes.

The opposite end part, i.e. in particular the end part arranged in the region of the insertion opening, can also have such a coolant box. This coolant box can have a distributor chamber, which distributes the coolant to the first pipes. In addition, a collecting chamber can be provided or respectively defined, which collects the coolant coming from the second pipes. Accordingly, at least one such inlet is connected to the distributor chamber, and at least one such outlet is connected to the collecting chamber.

In further advantageous embodiments, the cooler is pivotably arranged in the housing by means of such an end part. A corresponding pivot axis runs here through this end part and in particular perpendicularly thereto. This can be realized for example in that the end part is connected to the housing for example by such a wall or respectively by such an edge, and the wall or respectively the edge is movable, and in particular pivotable, with respect to the housing.

The attaching of the respective end part to the housing can be realized in any desired manner. For this, the housing and the end part can be flanged, in particular crimped, to one another. Hereby, in particular, a simple and/or movable attaching is possible.

The attaching of the end part to the housing can also be realized by means of a screwing or respectively a screw, in particular a collar screw, in order to enable a simple and/or movable attaching.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained further in the following description, wherein the same reference numbers refer to identical or similar or functionally identical components.

BRIEF DESCRIPTION OF THE DRAWINGS

There are shown, respectively diagrammatically

DETAILED DESCRIPTION

Figure 1:
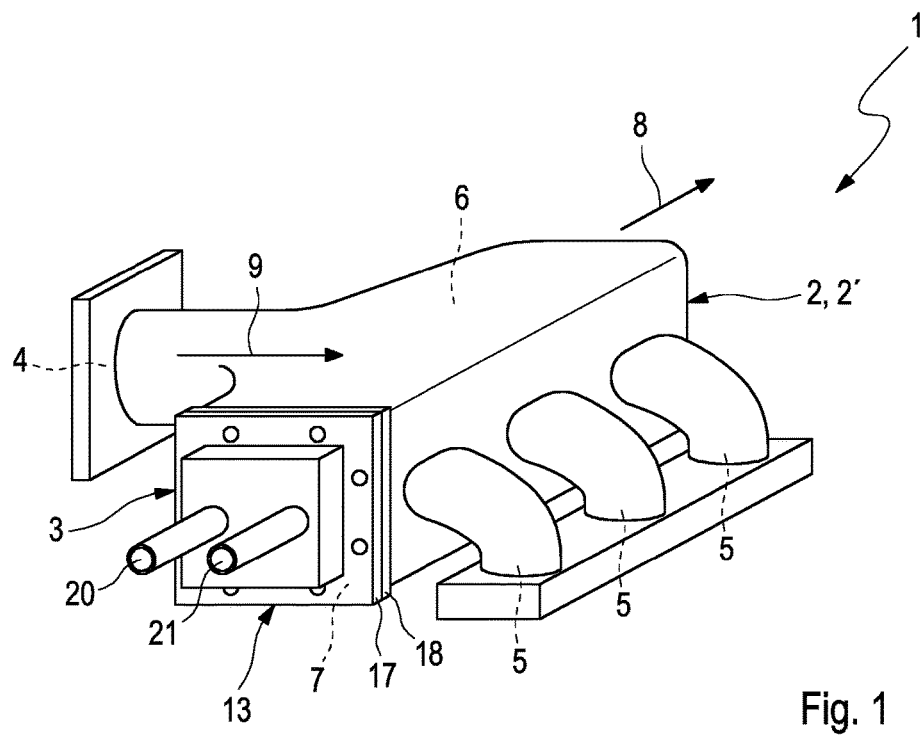
FIG. 1 a three-dimensional view of an intercooler assembly.

According to FIG. 1, an intercooler assembly 1, or abbreviated as assembly 1, has a housing 2 and a cooler 3, which can be designated as intercooler 3. The housing 2 is configured as distributor housing 2', which has an air inlet 4 and a plurality of air outlets 5 connected fluidically to the air inlet 4. Between the air inlet 4 and the air outlets 5, the housing 2 has a receiving space 6, into which the cooler 3 is inserted through an insertion opening 7 of the housing 2. Here, the cooler 3 is inserted into the housing 2 in an insertion direction 8 through the insertion opening 7. By means of the cooler 3, air, in particular charge air, flowing in an air flow direction 9 through the air inlet 4 into the housing 2, is cooled and subsequently arrives through the air outlets 5 out from the housing 2 or respectively from the assembly 1 and is directed for example to an internal combustion engine, not shown here. The charge air can originate here from a compressor, not shown here, of an exhaust gas turbocharger, which is likewise not shown.

Figure 2:
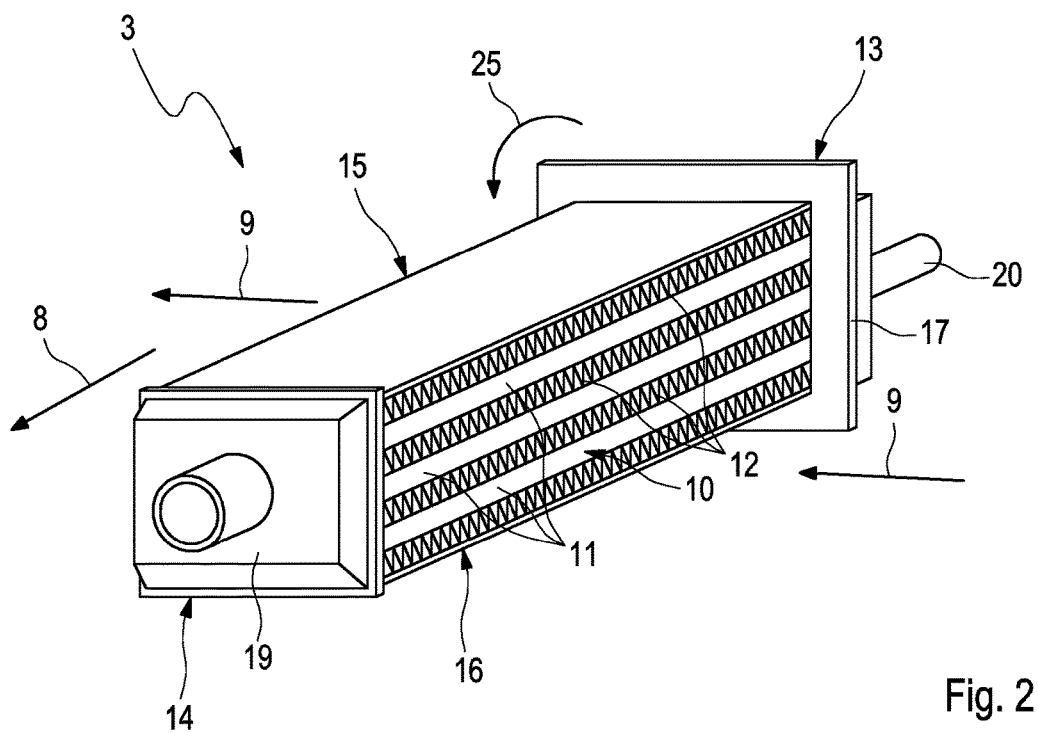
FIG. 2 a three-dimensional view of a cooler of the assembly.

FIG. 2 shows a three-dimensional view of the cooler 3, which has a pipe structure 10 with a plurality of pipes 11, which extend in insertion direction 8 and between which a rib structure 12 runs. The cooler 3 has four end parts 13, 14, 15, 16, namely end parts 13, 14 lying opposite in insertion direction 8, which are designated in the following as first end part 13 and second end part 14, purely for the sake of understanding. In addition, the cooler 3 has two further end parts 13, 14, 15, 16 at ends lying opposite transversely to the insertion direction 8 and air flow direction 9, which end parts are designated in the following as third end part 15 and fourth end part 16, purely for the sake of understanding. The end parts 15, 16 delimit the pipe structure 10 at correspondingly laterally opposite sides and provide here for a holding together of the pipe structure 10. It can be seen from FIGS. 1 and 2 that the first end part 13 has an end flange 17, which cooperates with an associated housing flange 18 in the region of the insertion opening 7, in order to attach the cooler 3 to the housing 2. The second end part 14, lying opposite the first end part 13, has a coolant box 19 on its side facing away from the first end part 13. The third end part 15 and the fourth end part 16 are configured in a substantially planar manner.

For cooling the charge air, a coolant, for example water, comes into use, which flows through the pipe structure 10 and thus cools the charge air flowing between the pipes 11 and the rib structure 12 in the air flow direction 9. The coolant is introduced into the pipe structure 10 via an exterior inlet 20 at the first end part 13, and flows out from the pipe structure 10 via an outlet 21, likewise formed externally at the first end part 13. Here, the coolant in the coolant box 19 is diverted between the pipes 11. By the cooling of the charge air and the heating, connected therewith, of the cooler, temperature differences occur within the pipe structure 10, which cause expansions or respectively contractions of the cooler 3 or respectively of the pipe structure 10 and deformations connected therewith.

Figure 3:
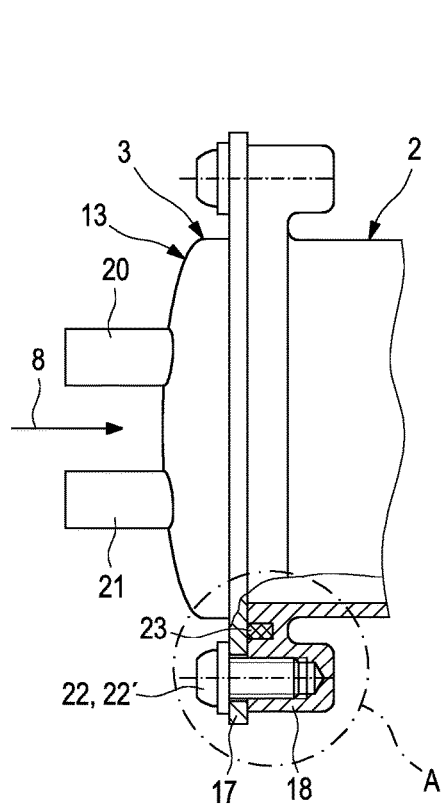
FIG. 3 a side view of the assembly, partially in section.
Figure 5:
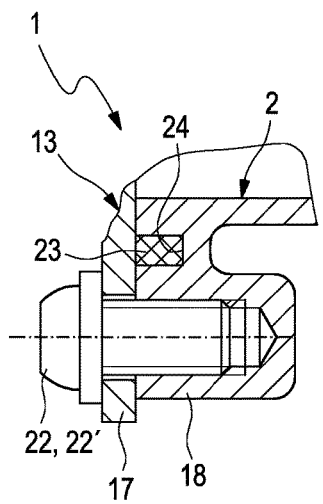
FIG. 5 a longitudinal section through the region designated by A in FIG. 3, FIG. 6 a longitudinal section through the region, designated by A in FIG. 3, in a different embodiment, FIG. 7 a longitudinal section through the region, designated by A in FIG. 3, in a further embodiment, FIG. 8 a longitudinal section through a region of the assembly in a variant not according to the invention, FIG. 9 the view of FIG. 8 in a different embodiment, FIG. 10 a longitudinal section through the assembly in a further embodiment, FIG. 11 a three-dimensional view, in section, through the assembly, FIG. 12 the view of FIG. 11 in a different embodiment, FIG. 13 a cross-section through a part of the assembly, FIG. 14 the view of FIG. 13 in a different embodiment, FIG. 15 the view of FIG. 2 in a different embodiment, FIG. 16 a side view of the arrangement with the cooler in its original form, FIG. 17 the view of FIG. 16 during operation of the assembly, FIG. 18 the view of FIG. 16 in the state of the cooler connected to a housing, FIG. 19 the view of FIG. 18 during operation of the assembly.

According to the invention, damage caused by said deformations are prevented or at least reduced in that the cooler 3 is connected to the housing 2 by means of at least one such end part 13, 14, 15, 16, wherein at least one of the end parts 13, 14, 15, 16 is movably attached to the housing 2. FIG. 3 shows a first embodiment for attaching the first end part 13 to the housing 2. Here, the region designated by "A" is shown in section and is illustrated on an enlarged scale in FIG. 5. From these figures, it can be seen that the end flange 17 is connected to the housing flange 18 by means of screws 22. The screws 22 are configured here as collar screws 22'. In addition, an elastic element 23 is provided, which is arranged in a groove 24 of the housing 2 open towards the end flange 17. Hereby, the connection flange 17 lies against the housing flange 18, wherein the elastic element 23 permits a movement of the end part 13 and therefore of the cooler 3 relative to the housing 2 in the insertion direction 8, in order to prevent or respectively compensate said damage and/or to compensate tolerances. The elastic element 23 serves furthermore for sealing the receiving space 6.

Figure 6:
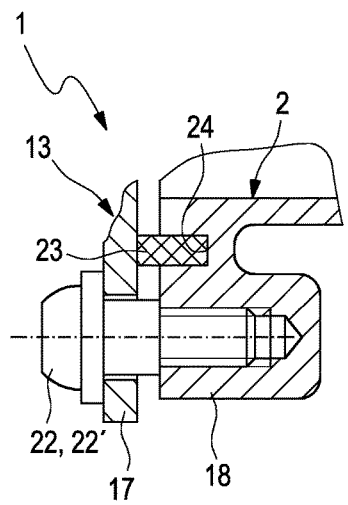

FIG. 6 shows a different embodiment, in which the first end part 13 and therefore the end flange 17 is arranged spaced apart with respect to the housing 2 and therefore with respect to the housing flange 18. For this, the elastic element 23 projects out from the groove 14.

Figure 7:
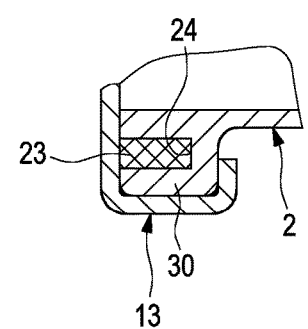

The embodiment shown in FIG. 7 differs from that shown in FIG. 6 in that the first end part 13 is flanged with the housing 2 and is spaced apart from a corresponding wall 30 of the housing 2. The flanging permits here additional freedoms of movement of the cooler 3 in the housing 2.

Figure 4:
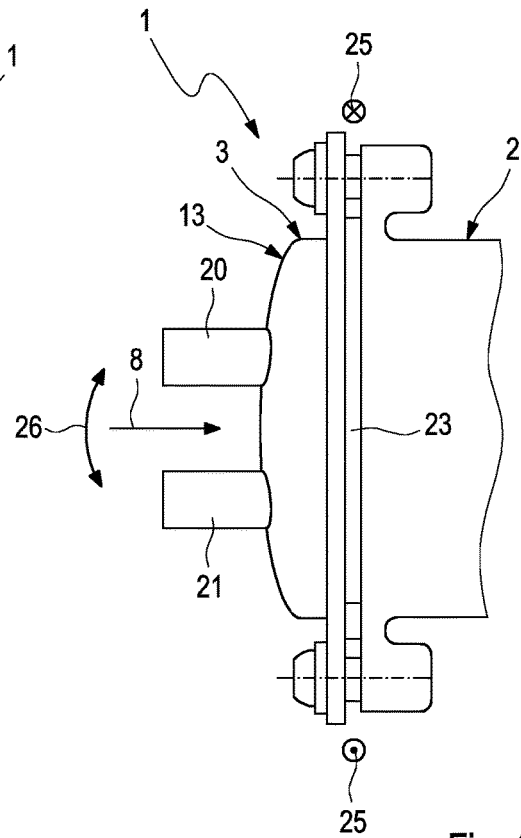
FIG. 4 a side view of the assembly of a different embodiment.

In the embodiments shown in FIGS. 3, 5, 6 and 7, the elastic element 23 extends in a circumferential direction 25 of the first end part 13, as is also shown in FIG. 4. Hereby, a uniform freedom of movement of the cooler 3 can be achieved. In addition, it is possible that the cooler 3 moves with a different intensity relative to the housing 2 in different regions. Hereby, a tilting of the cooler 3 with respect to the housing 2, indicated by a double arrow 26, is also possible, in order to counteract said damage or respectively to create tolerance compensations.

FIGS. 8 and 9 show embodiments for attaching the cooler 3 to the housing 2 by means of the second end part 14, which has the coolant box 19. In these figures, it can be seen on the one hand that the housing 2 has a mount 27, in which the coolant box 19 is arranged. The mount 27 is larger here than the coolant box 19. On the other hand, the second connection part 14 has a planar wall 28, which is arranged between the water box 19 and the pipe structure 10. The arranging of the second end part 14 on the housing 2 takes place here by means of this wall 28. In FIG. 8 the wall is arranged outside the mount 27 and is connected to the housing 2 with the use of screws 22. In FIG. 9 the wall 28 is arranged in the mount 27 and contacts there the housing 2. Therefore, in the embodiment shown in FIG. 9, the second end part 14 and therefore the cooler 3 is movable relative to the housing 2 in insertion direction 8. The second end part 14 can also be pivoted about a pivot axis 29 running through the second end part 14 and parallel to the insertion direction 8, and is also therefore movable relative to the housing 2.

FIG. 10 shows a further embodiment of the assembly. Here, the cooler 3 has only two such end parts 13, 14, namely the first end part 13 and the second end part 14. Both end parts 13, 14 have such a wall 28, wherein the first end part 13 has two opposite edges 31 protruding from the associated wall 28 in direction of extent of the first end part 13. The respective edge 31 protrudes here from the first end part 13 perpendicularly to the insertion direction 8 and is arranged in an associated slot 32 of the housing 2 and thus attached to the housing 2. Thereby, a form-fitting connection is brought about between the first end part 13 and the housing 2. Likewise, the concern here can be with an edge 31 running in circumferential direction 25, which edge can run in a closed manner in circumferential direction 25.

Hereby, the cooler 3 is able to be pivoted or respectively tilted relative to the housing 2 about a pivot axis 29 running parallel to the insertion direction 8, which runs through the first end part 13 and the second end part 14, or respectively in circumferential direction 25. In addition, the first end part 13 is movable in the air flow direction 9 relative to the housing 2.

Compared to FIG. 10, the embodiment shown in FIG. 11 has only the third end part 15 and the fourth end part 16. These end parts 15, 16 have respectively two edges 31, which protrude perpendicularly to the direction of extent of the end parts 15, 16 from the associated end part 15, 16. The edges 31 are arranged respectively in an associated slot 32, and the cooler 3 is thus attached to the housing 2. Therefore, a form-fitting connection is brought about between the edges 31 and the housing 2, wherein the edges 31 are movable or respectively displaceable along the associated slots 32. The slots 32 and the edges 31 run parallel here and in the insertion direction 8, so that the third end part 15 and the fourth end part 16 are movable in insertion direction 8 relative to the housing 2.

In the embodiment shown in FIG. 11, the mounting of the cooler 3 into the housing 2 can take place by the inserting of the cooler into the housing. In contrast hereto, the mounting of the embodiment shown in FIG. 10, which is illustrated on an enlarged scale in the region of the one of the edges 31 in FIG. 13, requires an injecting around of the edge 31.

FIG. 12 shows a further embodiment, in which the third end part 15 and/or the fourth end part 16 can be bonded and/or soldered and/or welded to the housing 2. Therefore, compared to FIG. 11, a form-fitting connection can be dispensed with. Here, the housing 2 has a constriction 36 in the region of the cooler 3, in order to receive the cooler 3.

FIG. 14 shows a further embodiment, which can come into use for example in the variant shown in FIG. 11. Here, the edges 31 protrude in the direction of extent of the third end part 15 or fourth end part 16 from the associated end part 15, 16 and are arranged on a placement area 33 of the housing 2. Here, the respective edge 31 can be bonded to the associated placement area 33.

Figure 15:
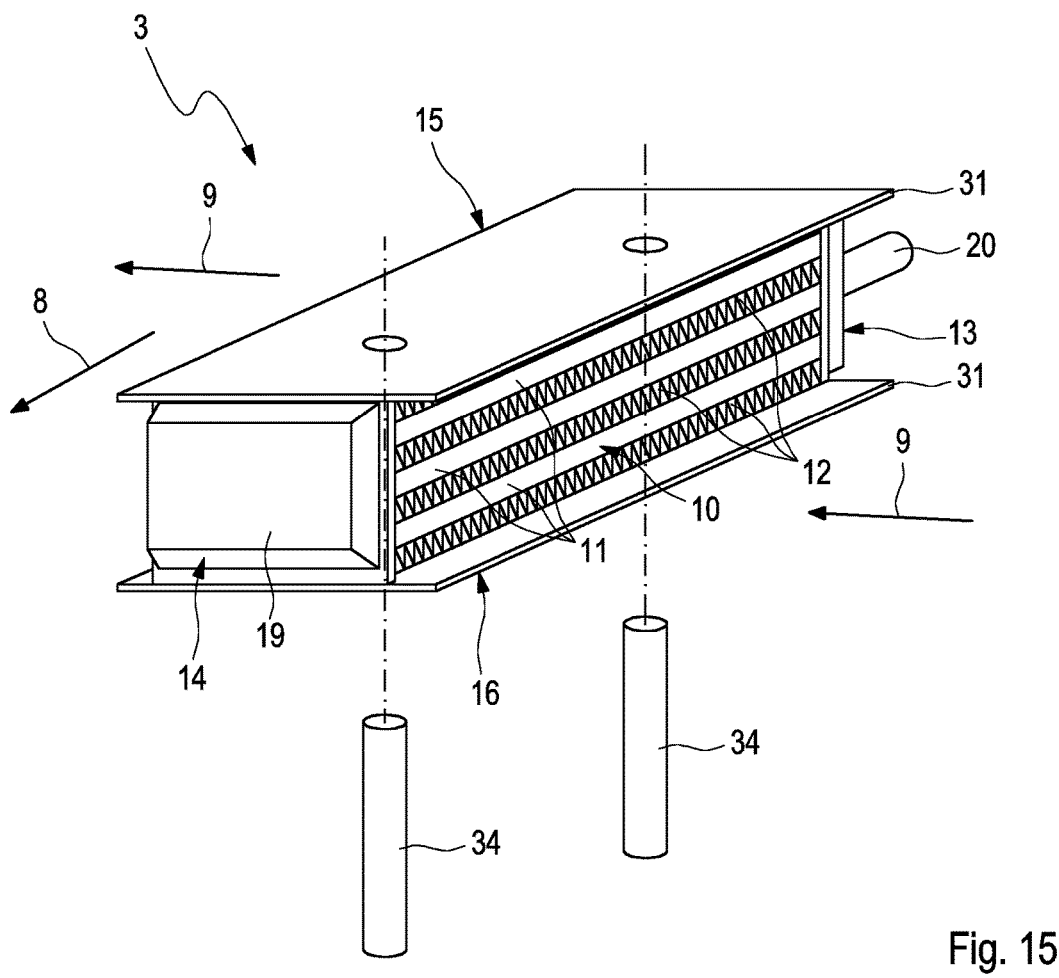

In FIG. 15, an embodiment of the cooler 3 is shown, which has 4 such end parts 13, 14, 15, 16. The third end part 15 and the fourth end part 16 have edges 31 protruding respectively in the air flow direction 9. The third end part 15 and the fourth end part 16 are connected to one another additionally by means of two tension anchors 34, running in a parallel manner, which are shown in non-mounted state in FIG. 15. The tension anchors 34 permit here a relative movement of the third end part 15 and of the fourth end part 16 with respect to one another transversely to the direction of the tension anchors 34 and therefore permit a possibility for preventing or at least reducing said damage.

Figure 16:
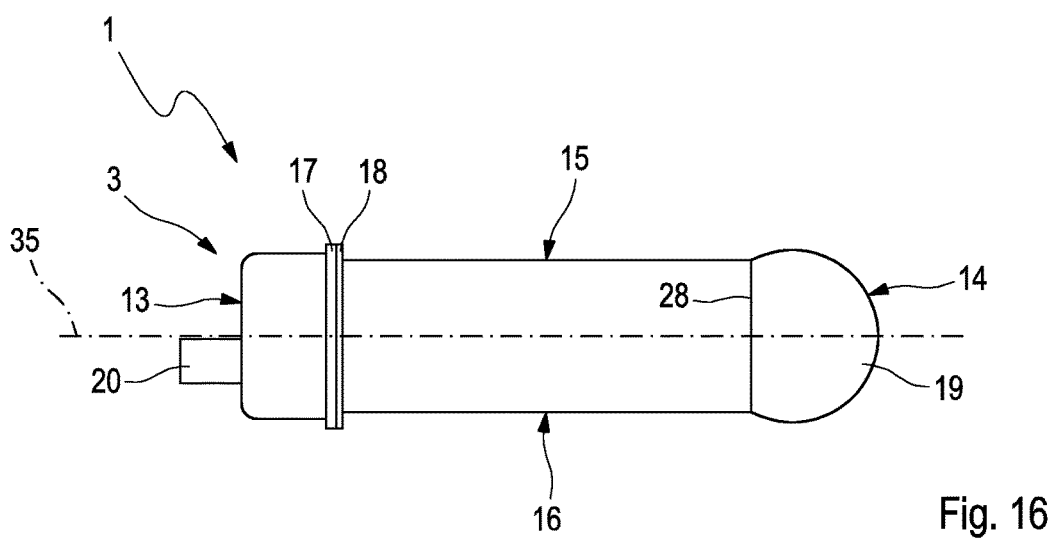

FIG. 16 shows a view of the cooler 3 in its original form, i.e. its form before mounting into the housing 2 or respectively outside the operation of the assembly 1. This original form or respectively state of the cooler 3 indicates the desired form of the cooler 3 during operation, because with this form, damage to the cooler 3 is prevented or reduced. The cooler 3 is securely connected to the housing flange 18 by means of the connecting flange 17, and is therefore fixed here substantially to the housing. In the original state, the third end part 15 and the fourth end part 16 run in a planar manner and parallel to one another. A longitudinal centre axis 35 of the cooler 3 in its original form runs accordingly centrally through the cooler 3.

Figure 17:
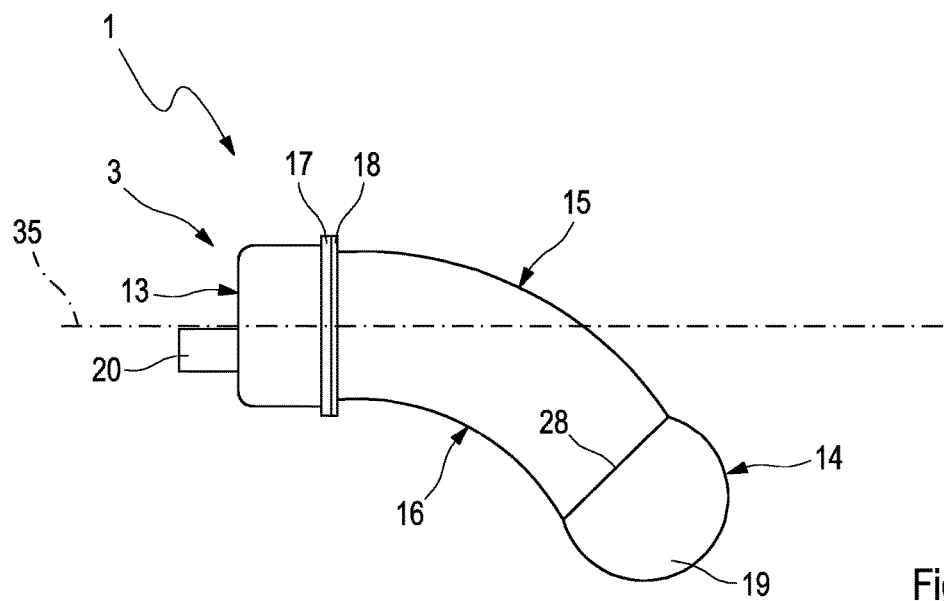

FIG. 17 shows the form of the cooler of FIG. 16 during operation of the assembly 1. Through the temperature differences within the cooler, the cooler 3 bends, in particular the pipe structure 10, in the lower direction illustrated by way of example in the view of FIG. 16. In this deformed or respectively bent state, the cooler 3 does not run centrally with respect to the longitudinal centre axis 35 of its original form. The third end part 15 and the fourth end part 16 are bent. In particular, damage can occur to the cooler 3 or respectively to the assembly 1 in this state.

Figure 18:
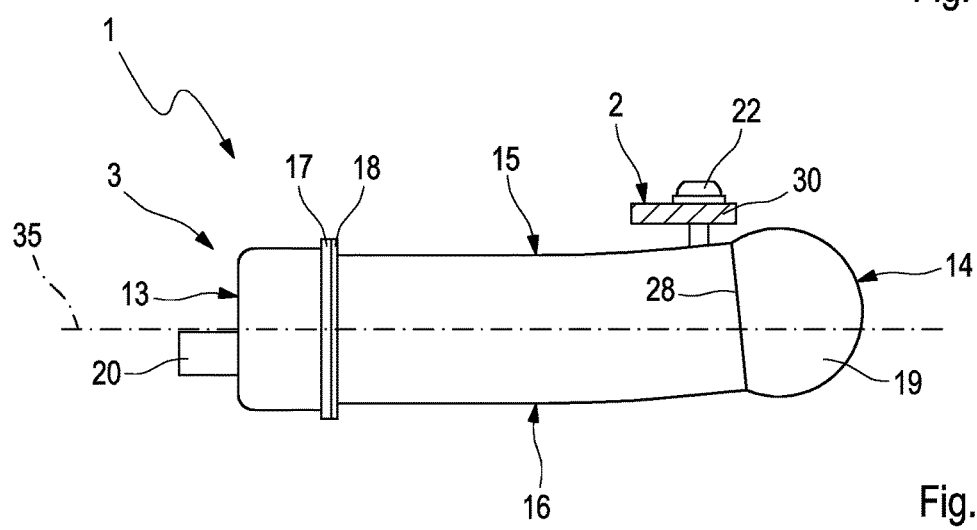

In order to counteract the bending of the cooler 3 in FIG. 17, the cooler 3 is pre-stressed in accordance with FIG. 18. The pre-stressing takes place by means of a screw 22, screwed into the housing 2, which screw pre-stresses the third end part 15 and therefore the cooler 3 in the direction of the housing 2 or respectively its wall 30. The pre-stressing therefore takes place in the opposite direction to the deformation or respectively bending expected during operation of the assembly 1 and illustrated in FIG. 17. The third end part 15 and therefore the cooler 3 is thus negatively pre-stressed. The cooler 3 does not run centrally with respect to the longitudinal centre axis 35 of its original form.

Figure 19:
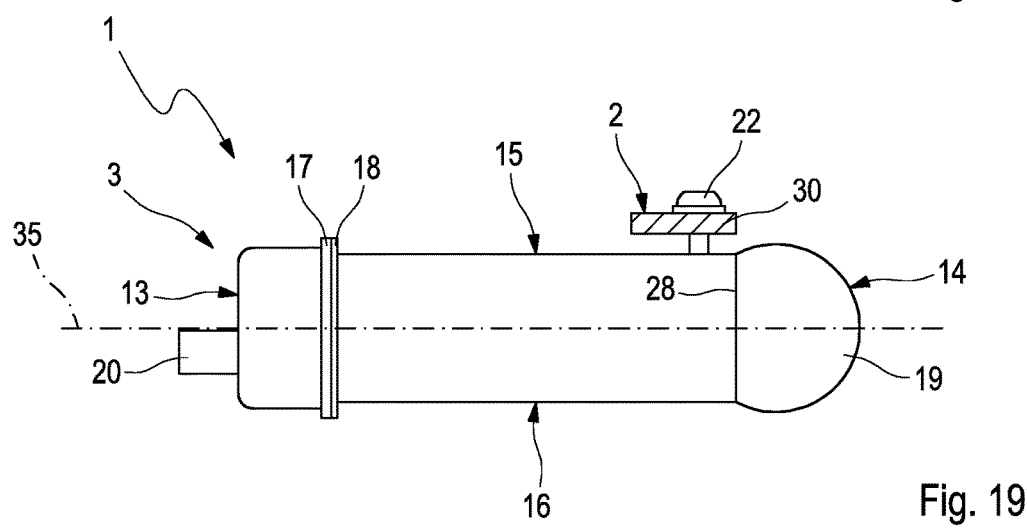

Here, the third end part 15 is movably attached or respectively pre-stressed to the housing 2. During operation of the arrangement 1, the cooler 3 bends in the direction shown in FIG. 17. The pre-stressing is selected here such that the pre-stressing and the bending are in opposition to one another such that the cooler 3, as illustrated in FIG. 19, assumes its original form during operation. In this form, the cooler 3 therefore runs, as desired, substantially centrally with respect to the longitudinal centre axis 35 of its original form. Therefore, damage to the assembly 1, in particular to the cooler 3, is prevented or at least reduced.

The invention claimed is:

1. An intercooler assembly comprising a housing through which charge air is flowable to an internal combustion engine, and a cooler arranged in the housing and through which the charge air is flowable to cool the charge air, wherein:

the cooler has a pipe structure through which a coolant is flowable to cool the charge air;

the housing has an insertion opening through which the cooler is insertable into the housing in an insertion direction running transversely to a flow direction of the charge air;

the cooler has a first end part and a second end part spaced apart from each other and arranged lying opposite one another transverse to the insertion direction;

the cooler has a third end part and a fourth end part lying opposite each other, running transversely to the first end part and to the second end part, and being arranged parallel to the flow direction;

the first, second, third, and fourth end parts laterally delimit the pipe structure and are mechanically connected to the pipe structure;

the cooler is mechanically connected to the housing by the first end part and includes a clearance between the third end part and a wall of the housing over an entire length of the cooler within the housing, starting from an end flange of the first end part to a flange corresponding with the second end part;

at least one of the second, third, and fourth end parts is movably attached to the housing with respect to the housing;

the cooler is pre-stressed, closer to the second end part relative to the first end part, to consume at least a portion of the clearance, toward the housing by the third end part; and the pre-stressing is oriented in a direction opposite to a deformation of the cooler resulting from the cooling of the charge air.

2. The assembly according to claim 1, wherein at least one end part has a planar wall.

3. The assembly according to claim 1, wherein an elastic element is arranged between at least one end part and the housing, wherein the elastic element extends in a circumferential direction along the at least one end part.

4. The assembly according to claim 1, wherein:
the housing has a housing flange complementary to the end flange of the second end part; and
the end flange of the second end part and the housing flange are connected to one another for mechanically connecting the cooler to the housing.

5. The assembly according to claim 1, wherein at least one of the end parts has a protruding edge that connects the at least one of the end parts to the housing, and wherein the protruding edge is arranged one of in an associated slot of the housing or on an associated placement area of the housing.

6. The assembly according to claim 1, further comprising a tension anchor connecting two of the end parts opposite one another.

7. The assembly according to claim 6, wherein the tension anchor permits a relative motion between the third end part and the fourth end part.

8. The assembly according to claim 1, wherein the cooler is pivotably arranged in the housing by one of the end parts about a pivot axis running through the one of the end parts.

9. The assembly according to claim 1, wherein at least one of an inlet for letting in the coolant into the pipe structure and an outlet for letting out the coolant from the pipe structure is formed on one of the end parts.

10. The assembly according to claim 1, wherein the at least one end part and the housing are crimped to one another.

11. The assembly according to claim 1, wherein the at least one end part is spaced apart from a wall of the housing.

12. The assembly according to claim 1, wherein at least one end part has a planar wall.

13. The assembly according to claim 1, wherein the cooler is pre-stressed against the housing.

14. An intercooler assembly comprising a housing through which charge air is flowable to an internal combustion engine, and a cooler arranged in the housing and through which the charge air is flowable to cool the charge air, wherein:

the housing has an insertion opening through which the cooler is insertable into the housing in an insertion direction running transversely to a flow direction of the charge air;
the cooler includes:
a pipe structure through which a coolant for cooling the charge air is flowable;
a first end part and a second end part arranged lying opposite each another transverse to the insertion direction; and
a third end part and a fourth end part arranged lying opposite each other transverse to the first end part and the second end part, and parallel to the flow direction;
the first, second, third, and fourth end parts laterally delimit the pipe structure and are mechanically connected to the pipe structure;
at least one of the end parts has a protruding edge that connects the at least one of the end parts to the housing, and the housing includes an associated slot, the protruding edge being arranged in the associated slot;
the cooler is mechanically connected to the housing by the first end part and includes a clearance between the third end part and a wall of the housing, the clearance between the third end part and the wall extending from an end flange of the first end part to a flange of the second end part, and the cooler is pre-stressed toward the housing, closer to the second end part relative to the first end part, to consume at least a portion of the clearance, by at least the third end part in a direction opposite a deformation of the cooler resulting from cooling of the charge air; and
at least one of the second, third, and fourth end parts is movably attached to the housing.

15. The assembly according to claim 12, further comprising a tension anchor connecting two of the end parts opposite one another.

16. The assembly according to claim 15, wherein the tension anchor permits a relative motion between the third end part and the fourth end part.

17. The assembly according to claim 12, wherein the cooler is pivotably arranged in the housing by one of the end parts about a pivot axis running through the one of the end parts.

18. The assembly according to claim 12, wherein at least one of an inlet for letting in the coolant into the pipe structure and an outlet for letting out the coolant from the pipe structure is formed on one of the end parts.

19. The assembly according to claim 12, wherein the cooler is pre-stressed against the housing.

* * * * *